United States Patent
Qu et al.

(10) Patent No.: US 10,961,441 B2
(45) Date of Patent: Mar. 30, 2021

(54) ACIDIZING SOLUTION FOR DISSOLUTION OF CLAY MINERAL AND PREPARATION METHOD THEREOF

(71) Applicant: CHINA UNIVERSITY OF PETROLEUM (EAST CHINA), Qingdao (CN)

(72) Inventors: Xiyu Qu, Qingdao (CN); Sirui Chen, Qingdao (CN); Xiaofang Dong, Qingdao (CN); Longwei Qiu, Qingdao (CN); Guanmin Wang, Qingdao (CN); Yangchen Zhang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 16/619,661

(22) PCT Filed: Nov. 20, 2018

(86) PCT No.: PCT/CN2018/116353
§ 371 (c)(1),
(2) Date: Dec. 5, 2019

(87) PCT Pub. No.: WO2020/019593
PCT Pub. Date: Jan. 30, 2020

(65) Prior Publication Data
US 2021/0054261 A1    Feb. 25, 2021

(30) Foreign Application Priority Data
Jul. 23, 2018 (CN) .......................... 201810813693.4

(51) Int. Cl.
*C09K 8/72* (2006.01)
*E21B 43/27* (2006.01)
*C09K 8/74* (2006.01)

(52) U.S. Cl.
CPC ................ *C09K 8/725* (2013.01); *C09K 8/74* (2013.01); *E21B 43/27* (2020.05); *C09K 2208/12* (2013.01)

(58) Field of Classification Search
CPC ...... C09K 8/74; C09K 8/725; C09K 2208/12; E21B 43/27
See application file for complete search history.

(56) References Cited

U.S. PATENT DOCUMENTS

| 4,522,785 A * | 6/1985 | D'Errico | C23F 11/04 252/390 |
| 4,934,457 A * | 6/1990 | Wallender | C09K 8/52 166/279 |
| 2006/0264335 A1* | 11/2006 | Penna | C23F 11/04 507/244 |
| 2012/0145401 A1* | 6/2012 | Reyes | C09K 8/78 166/305.1 |
| 2016/0265316 A1* | 9/2016 | Reyes | C23F 11/04 |
| 2018/0251673 A1* | 9/2018 | Beuterbaugh | C09K 8/528 |

FOREIGN PATENT DOCUMENTS

| CN | 103436247 A | 12/2013 |
| CN | 104109528 A | 10/2014 |
| CN | 105969329 A | 9/2016 |
| CN | 108690599 A | 10/2018 |

* cited by examiner

*Primary Examiner* — Angela M DiTrani Leff
(74) *Attorney, Agent, or Firm* — SZDC Law P.C.

(57) ABSTRACT

The invention provides an acidizing solution for dissolution of a clay mineral and a preparation method thereof. The acidizing solution comprises hydrochloric acid, fluoboric acid, acetic acid, trifluoroacetic acid, hydrogen peroxide, ammonium chloride, dimethylamino-methylbenzotriazole, alkyl ammonium chloride, and polymethylacrylic acid. The acidizing solution provided by the invention can effectively dissolve organic matter, such as clay minerals and cements, in a high-temperature oil-gas reservoir over 160° C., inhibit swelling and migration of clay particles in the presence of water in the acidizing process, avoid secondary deposition of the reservoir, and improve the permeability of the reservoir. The acidizing solution can be prepared and used on the field conveniently and is safe and reliable.

8 Claims, No Drawings

ACIDIZING SOLUTION FOR DISSOLUTION OF CLAY MINERAL AND PREPARATION METHOD THEREOF

This application is the National Stage Application of PCT/CN2018/116353, filed on Nov. 20, 2018, which claims priority to Chinese Patent Application No.: CN 201810813693.4, filed on Jul. 23, 2018, which is incorporated by reference for all purposes as if fully set forth herein.

BACKGROUND OF THE INVENTION

1. Technical Field

The invention belongs to the field of petroleum engineering, and particularly relates to an acidizing solution for dissolution of a clay mineral and a preparation method thereof.

2. Description of Related Art

Low-permeability oil-gas reservoirs are weak in production capacity due to their high seepage resistance, high energy consumption during fluid migration, low pressure of formation pressure and stream pressure. The fracturing process is commonly adopted nowadays to obtain high production at the initial stage; however, the production declines rapidly, and the sustainable production capacity is low. With the deeper understanding of the stratum characteristics and damage factors of the low-permeability reservoirs, more and more compound acid solutions, additives and acidizing processes appear successful and have been put into use.

As for mud shale reservoirs with extremely low matrix porosity and permeability, mass fracturing is necessary to achieve an industrial capacity. Shale minerals primarily include quartz minerals, clay minerals (aluminosilicate minerals) and carbonatite minerals, wherein the content of the clay minerals is high. Reservoir fracturing should be carried out mud shale reservoirs before development; however, due to the fact that the rock of the mud shale reservoirs is too compact, the fracturing pressure is too high. Before fracturing, an acidizing solution should be injected into the mud shale reservoirs to destroy the reservoirs in the drilling process such as casing the well wall to collapse, and dissolving minerals near the shaft to reduce the fracturing pressure, which in turn guarantees eventual injection of fracturing fluid.

Meanwhile, pores and cracks of the mud shale reservoirs are storage spaces and migration channels of underground fluid; however the cracks are usually filled with fillers and have certain cementing strength. Typically, the acidizing solution reacts with minerals and cements in the rock to reduce the fracturing pressure of the rock and the cementing strength of the cracks so as to generate more cracks. An acidizing solution system for the clay mineral includes conventional hydrochloric acid and mud acid, while phosphoric acid, sulfuric acid, nitric acid and organic acid have been put into use consecutively in recent years.

The clay mineral expands and migrates in the presence of water and consequentially blocks the channels and pores of the reservoir. Under the temperature of 135° C., most clay will turn into silica gel polymer after being soaked in hydrochloric acid, which in turn results in scale formation and blockage, and consequentially, the success rate of acidizing transformation is decreased. Chinese Patent Application No. CN 201410211586.6 discloses a composite acid solution used before fracturing a shale reservoir, wherein hydrochloric acid and fluoboric acid are adopted for reservoirs with the clay content over 40%, and the fluoboric acid is hydrolyzed to slowly release hydrofluoric acid to dissolve silicate minerals, has a good clay stabilizing effect, is wide in applicable temperature range, and is a deep-penetration retarded acid. However, this method leads to large flow resistance of acid residues, is not beneficial to backflow and seepage of formation fluid, and fails to take the multi-scale property of shale fluid channels into consideration, and consequentially, the density of a crack network cannot meet the requirement for efficient development of shale oil and gas.

Because the shale reservoir is rich in clay minerals, detrital minerals and authigenic minerals and contains a large quantity of organic matter and the majority of organic matter can be retained by the clay materials, the adsorption, desorption and filtration characteristics of shale may be changed by dissolved pores and crack generated in the acidizing transformation process, which in turn results in poor matching of a novel acidizing solution and additive with low-permeability reservoirs and secondary damage to deep low-permeability reservoirs and even ultra-deep low-permeability reservoirs with large deposition and diagenesis differences and complex cement types. The compatibility of the novel acidizing solution and additive with low-permeability shale reservoirs rich in clay minerals is worse, and cross-over study on petromineralogy and oil reservoir acidizing transformation technology and repeated laboratory optimization and screening in have to be carried out to fulfill transformations of the reservoirs, which restrains the success rate of acidizing transformations of the reservoirs at present.

In view of this, it is necessary to make a highly-targeted acidizing scheme to improve the pore throat radius, increase the permeability of reservoirs within the acidizing radius, effectively prevent collapses, avoid secondary destroy to low-permeability reservoirs, and maximize the permeability of the reservoirs.

BRIEF SUMMARY OF THE INVENTION

The objective of the invention is to solve the problems of the prior art by providing an acidizing solution for dissolution of a clay mineral and a preparation method thereof.

The technical solution adopted by the invention to fulfill the above objective is as follows:

An acidizing solution for dissolution of a clay mineral comprises:

hydrochloric acid, fluoboric acid, acetic acid, trifluoroacetic acid, and hydrogen peroxide, ammonium chloride; and Dimethylamino-methylbenzotriazole, alkyl ammonium chloride, and polymethylacrylic acid.

In the acidizing solution, the mass concentration of hydrochloric acid is 10%-15%, the mass concentration of fluoboric acid is 5%-15%, the mass concentration of acetic acid is 0-3%, the mass concentration of trifluoroacetic acid is 4%-9%, the mass concentration of hydrogen peroxide is 15%-25%, the mass concentration of ammonium chloride is 5%, the mass concentration of dimethylamino-methylbenzotriazole is 2%, the mass concentration of alkyl ammonium chloride is 0.5%-2%, the mass concentration of polymethylacrylic acid is 0.2%-1%, and the balance is water.

The alkyl ammonium chloride is at least one of N-octadecyl propylidene diamine di-ammonium chloride and 3-Chloro-2-hydroxypropyl-trimethyl ammonium chloride.

The specific gravity (also referred to as relative density) of solid to liquid is the ratio of the density of a substance in a completely airtight state to the density (999.972 kg/m$^3$) of the substance under pure $H_2O$ at a standard atmospheric pressure and at a temperature of 3.98° C. The concentration of each acid in the composite acidizing solution is the concentration of the pure acid.

The invention further provides a preparation method of the acidizing solution. The preparation method specifically comprises the following steps:

Under a stirring condition, adding dimethylamino-methylbenzotriazole to water, then slowly adding hydrochloric acid, fluoboric acid, acetic acid, trifluoroacetic acid and ammonium chloride, then adding hydrogen peroxide which is in turn uniformly mixed, and finally adding alkyl ammonium chloride and polymethylacrylic acid.

The invention further provides an application of the acidizing solution to dissolution of a mud shale reservoir.

The acidizing solution is applied to a reservoir with a clay mineral content over 30%.

As for a high-temperature reservoir at a temperature over 160° C., the mass concentration of trifluoroacetic acid in the acidizing solution is 7%-9%, and the mass concentration of hydrogen peroxide in the acidizing solution is 20%-25%.

An imidazoline condensate is added to the acidizing solution, and the mass concentration of the imidazoline condensate in a prepared compound acidizing solution is 4%.

The imidazoline condensate is a condensation product synthesized from an imidazoline compound, fatty acid, and derivatives of the fatty acid, wherein the imidazoline compound has imidazoline five-membered heterocycle, the heterocycle has a hydrophilic branched chain containing different active groups such as an amide functional group, an amine functional group and a hydroxyl functional group as well as an alkyl hydrophobic branched chain containing different carbon chains, and hydrophilic branched chain and the alkyl hydrophobic branched chain are bonded to N.

According to the acidizing solution for dissolution of a clay mineral of the invention:

(1) Trifluoroacetic acid (TFA) is used as one of the acid reagents for the first time and thermally cracks in the hot stratum environment to generate carbon monoxide, carbon dioxide and hydrofluoric acid, a small part of gas is dissolved in fluid under the effect of storage pressure and temperature, and most part of gas is dispersed in acidizing solution residues in the form of drifting micro-bubbles, so that the acidizing solution residues can be easily removed from the oil-gas reservoir. With the extension of the permeation distance and gradual proceeding of thermal cracking, the concentration of generated hydrofluoric acid is decreased, the F/A1 ratio is decreased, the balance of fluorosilicone and aluminum fluoride complexes is maintained, secondary destroy caused in the acidizing process is reduced, and the purpose of deep permeation and slow reaction for dissolving clay in stratum pores is achieved; and the secondary reaction between fluosilicic acid and aluminosilicate is avoided, which may otherwise generate silica gel deposition on the surface of clay minerals, and the reservoir is protected against damage.

(2) Hydrogen peroxide can effectively oxidize organic matter in shale, including organic matter adsorbed by the clay minerals, to generate organic acid which is able to generate dissolution pores under a high-temperature condition, so that the seepage capacity is improved without destroying the intactness of the shale structure.

(3) In order to stabilize high-temperature deep wells of low-permeability strata and effectively support natural cracks and dissolution cracks, polypotassium methacrylate is used to retrain the dispersion effect of mud shale, reduce water losses, improve the flow pattern, improve lubrication, and effectively inhibit stratum slurrying, and can match with various treating agents; and anions polymerized in polypotassium methacrylate can effectively chelate a large quantity of metal ions dissolved in acid residues to prevent precipitation of inorganic salt and sediments, which may otherwise block the pores in the strata and cause damage to pipes and equipment.

(4) N-octadecyl propylidene diamine di-ammonium chloride, 3-Chloro-2-hydroxypropyl-trimethyl ammonium chloride and polymethylacrylic acid are used as additives to match acids and are evenly mixed, so that swelling, dispersion and migration of clay particles in the presence of water are effectively avoided.

(5) The acidizing solution is suitable for a temperature over 160° C., thus being applicable to high-temperature deep wells. The acidizing solution is prepared from conventional chemical agents and industrial products, can be prepared and used on the field conveniently, and is safe and reliable.

DETAILED DESCRIPTION OF THE INVENTION

The contents of the invention are further expounded below with reference to specific implementations provided by the following embodiments. Those skilled in this research field would appreciate that the scope of the subject matter of the invention is not limited to the following embodiments, and all techniques achieved on the basis of the above contents of the invention should fall within the scope of the invention.

Unless otherwise specified, the experimental methods adopted in the following embodiments are all conventional methods. Unless otherwise specified, all reagents, materials and instruments adopted in the following embodiments are commercially available.

Imidazoline condensate solution is purchased from Changchun City Huatai Petroleum Technology Development Co., Ltd., takes an imidazoline condensate as the key component, and is compounded with other organic solvents.

In one embodiment of the invention, the preparation method of the acidizing solution comprises the following steps:

All raw materials are prepared by weight; under a stirring condition, dimethylamino-methylbenzotriazole is added into a solution preparation tank and is fully stirred for 5-10 min; then, hydrochloric acid, fluoboric acid, acetic acid, trifluoroacetic acid and ammonium chloride are slowly added and are fully stirred for 10-20 min under a temperature of 20-30° C.; afterwards, hydrogen peroxide is added and uniformly mixed; and finally, at least one of N-octadecyl propylidene diamine di-ammonium chloride and 3-Chloro-2-hydroxypropyl-trimethyl ammonium chloride, and polymethylacrylic acid are added and are stirred for 10-20 min at the indoor temperature to obtain the acidizing solution.

1. Method and devices used for testing a core dissolution rate in the embodiments of the invention (1) A reservoir core is crushed by a crusher and is then screened by a 200-mesh sieve until over 95% of core powder is undersize;

(2) The undersize core powder is dried, about 2 g of dried core powder is weighed, and the accurate weight is recorded;

(3) 100 mL of acidizing solution is prepared, the weighed core powder and the acidizing solution are added into a hastelloy reaction kettle to be kept airtight and is then placed into a muffle furnace set to an experimental temperature to react for 5 h;

(4) The reacted core powder is filtered, dried and weighted; and (5) The dissolution rate of the acidizing solution to the reservoir core is obtained by calculation according to a weight loss of the core before and after treatment with the acidizing solution.

2. Detection method for inhibiting deposition rate of fluosilicate and fluoaluminate in the embodiments of the invention (1) 20 mL of acidizing solution is added into test tubes, and then 20 mL of saline solutions (2% KCl solution, 2% $NaHCO_3$ solution, and 1% $AlCl_3$ solution) are added to the test tubes respectively;

(2) 20 mL of prepared sodium silicate solution is gradually added into the test tubes, and then the test tubes are placed under an indoor temperature to observe the deposition condition; and (3) Sediments are weighed, the concentration of particles in acid residues is measured, and the deposition inhibition rate is calculated.

3. Selection of mud shale reservoir samples in the embodiments of the invention

A test core sample 1 used in the invention mainly contains feldspar, clay minerals, calcite, dolomite, and dense and continuous organic matter, wherein the total content of the feldspar and the clay minerals is 40%-50% in general, the content of brittle minerals is 30% in average, and the content of the organic matter is 10%. A test core sample 2 mainly contains calcite, dolomite, clay materials, quartz, and dense and continuous organic matter, wherein the total content of the feldspar and the clay materials is 30%-40% in general, the content of brittle minerals is 40% in average, and the content of the organic matter is 8%.

4. Methods for testing the dissolution properties of the acidizing solution prepared in the embodiments of the invention In the embodiments, the anti-swelling rate is measured through a dilatometer method according to *The Performance Test Method for Clay Stabilizer for Fracturing Acidization* SY/T5762-1995, and the stability of ferric ions is measured according to *The Performance Evaluation Method for Ferric Ion Stabilizer for Acidization* SY/T6571-2012.

Embodiment 1

The acidizing solution comprises 10% of hydrochloric acid, 10% of fluoboric acid, 2% of acetic acid, 7% of trifluoroacetic acid, 5% of ammonium chloride, and the balance water.

Embodiment 2

The acidizing solution comprises 10% of hydrochloric acid, 10% of fluoboric acid, 2% of acetic acid, 20% of hydrogen peroxide, 5% of ammonium chloride, and the balance water.

Embodiment 3

The acidizing solution comprises 10% of hydrochloric acid, 10% of fluoboric acid, 2% of acetic acid, 9% of trifluoroacetic acid, 25% of hydrogen peroxide, 5% of ammonium chloride, and the balance water.

Embodiment 4

The acidizing solution comprises 10% of hydrochloric acid, 10% of fluoboric acid, 2% of acetic acid, 9% of trifluoroacetic acid, 20% of hydrogen peroxide, 5% of ammonium chloride, 2% of dimethylamino-methylbenzotriazole, 2% of N-octadecyl propylidene diamine di-ammonium chloride, 1% of polymethylacrylic acid, and the balance water.

Embodiment 5

The acidizing solution comprises 10% of hydrochloric acid, 10% of fluoboric acid, 2% of acetic acid, 9% of trifluoroacetic acid, 20% of hydrogen peroxide, 5% of ammonium chloride, 2% of dimethylamino-methylbenzotriazole, 2% of N-octadecyl propylidene diamine di-ammonium chloride, 1% of polymethylacrylic acid, and the balance water.

Embodiment 6

The acidizing solution comprises 10% of hydrochloric acid, 10% of fluoboric acid, 2% of acetic acid, 7% of trifluoroacetic acid, 25% of hydrogen peroxide, 5% of ammonium chloride, 4% of imidazoline condensate solution, 2% of N-octadecyl propylidene diamine di-ammonium chloride, 1% of polymethylacrylic acid, and the balance water.

Embodiment 7

The acidizing solution comprises 10% of hydrochloric acid, 10% of fluoboric acid, 2% of acetic acid, 9% of trifluoroacetic acid, 25% of hydrogen peroxide, 5% of ammonium chloride, 2% of dimethylamino-methylbenzotriazole, 2% of 3-Chloro-2-hydroxypropyl-trimethyl ammonium chloride, and the balance water.

Performance evaluation of the acidizing solution in the above embodiments:

1. The acidizing solution of the invention can effectively dissolve stratum minerals and organic matter causing blockage without destroying the framework of the rock stratum. Table 1 is a test data table of the dissolution effect of the acidizing solution in embodiments 1-7 on the test core samples.

TABLE 1

Table of core dissolution test data

| Core sample | Embodiment | Dissolution rate (%) | Breakage rate (%) |
|---|---|---|---|
| Sample 1 | Embodiment 1 | 22.2% | 2.9 |
| | Embodiment 2 | 23.7% | 3.0 |
| | Embodiment 3 | 30.9% | 3.3 |
| | Embodiment 4 | 31.5% | 2.2 |
| | Embodiment 5* | 38.4% | 3.4 |
| | Embodiment 6* | 37.8% | 3.5 |
| | Embodiment 7* | 38.2% | 3.8 |
| Sample 2 | Embodiment 1 | 13.2% | 2.6 |
| | Embodiment 2 | 13.8% | 2.6 |
| | Embodiment 3 | 22.5% | 2.8 |
| | Embodiment 4 | 22.7% | 1.7 |
| | Embodiment 5* | 27.3% | 3.0 |
| | Embodiment 6* | 27.0% | 3.1 |
| | Embodiment 7* | 27.4% | 3.5 |

Note: the dissolution temperature in Embodiments 1-4 is 100° C., and the dissolution temperature in Embodiments 5-7 is 160° C.

The acidizing solution prepared in the invention is suitable for a temperature range of 100–160° C. The acidizing solution prepared in Embodiment 4 has the highest dissolution rate to the reservoir core at the temperature of 100° C., and the breakage rates of sample frameworks is lower than those in Embodiments 1-3. The acidizing solution prepared in Embodiment 5 does not excessively dissolve the reservoir core at the temperature of 160° C., and the breakage rates of the two sample frameworks are lower than those in Embodiment 6 and Embodiment 7.

2. The acidizing solution in the invention can avoid secondary deposition of sensitive minerals in the acidizing process, effectively prevent swelling of the clay mineral in the presence of water, enhance the wettability of the surfaces of reservoir minerals, and improve the acidizing effect.

Under the normal temperature, fluosilicate and fluoaluminate sediments were generated in the acidizing solution system in all the embodiments.

The corrosion rate of the acidizing solution in Embodiments 5-7 to N80 sheet steel is tested for 2 h at a temperature of 140° C., a pressure of 16 MPa and a speed of 200 r/min to obtain test results.

Table 2 is a table of the comprehensive performance of the acidizing solution prepared in Embodiments 1-3 and 5-7.

TABLE 2

Table of the comprehensive performance of acidizing solution

| Embodiment | Fluorosilicone/ aluminate deposition inhibition rate (%) | Corrosion rate (g/m² · h) | Ferric ion (Fe³⁺) stabilizing capacity | Anti- swelling rate (%) |
|---|---|---|---|---|
| Embodiment 1 | 40.1 | >100 | 51 mg/mL | 31% |
| Embodiment 2 | 33.2 | >100 | 43 mg/mL | 34% |
| Embodiment 3 | 47.3 | >100 | 44 mg/mL | 35% |
| Embodiment 5 | 58.1 | 47.21 | 66 mg/mL | 76% |
| Embodiment 6 | 56.8 | 48.80 | 64 mg/mL | 77% |
| Embodiment 7 | 48.4 | 47.67 | 52 mg/mL | 69% |

The acidizing solution prepared in Embodiment 5 and Embodiment 6 has a lower corrosion rate to steel tubes, has a ferric ion stabilizing capacity obviously superior to that of other acidizing solutions, and can remarkably inhibit secondary deposition in the acidizing process. The acidizing solution prepared in Embodiment 5, Embodiment 6 and Embodiment 7 can effectively retrain swelling, dispersion and migration of clay particles in the presence of water.

3. Core displacement tests show that the acidizing solution of the invention can effectively improve the core permeability and meet acidizing requirements of reservoirs containing different minerals, and acid residues are limpid. Table 3 shows displacement test date of the acidizing solution in Embodiments 1-7 to the core samples.

TABLE 3

Core displacement test data

| Core Sample | Embodiment | Permeability before acidization | Permeability after acidization | Increase rate (%) |
|---|---|---|---|---|
| Sample 1 | Embodiment 1 | 32.1 | 81.6 | 154.2 |
|  | Embodiment 2 | 34.4 | 90.1 | 161.8 |
|  | Embodiment 3 | 48.3 | 135.3 | 180.1 |
|  | Embodiment 4 | 44.8 | 132.2 | 195.1 |
|  | Embodiment 5* | 28.6 | 104.9 | 266.7 |
|  | Embodiment 6* | 30.2 | 108.7 | 259.9 |
|  | Embodiment 7* | 41.2 | 142.3 | 245.3 |

TABLE 3-continued

Core displacement test data

| Core Sample | Embodiment | Permeability before acidization | Permeability after acidization | Increase rate (%) |
|---|---|---|---|---|
| Sample 2 | Embodiment 1 | 67.4 | 158.6 | 135.3 |
|  | Embodiment 2 | 73.5 | 180.2 | 145.2 |
|  | Embodiment 3 | 59.7 | 164.4 | 175.3 |
|  | Embodiment 4 | 60.6 | 171.3 | 182.6 |
|  | Embodiment 5* | 75.2 | 253.4 | 237.0 |
|  | Embodiment 6* | 64.1 | 211.0 | 229.9 |
|  | Embodiment 7* | 72.2 | 235.9 | 226.7 |

Note: the test temperature in Embodiments 1-4 is 100° C., and the test temperature in Embodiments 5-7 is 160° C.

The acidizing solution in the embodiments of the invention can obviously improve the core permeability of two samples with different clay mineral contents when used for acidizing transformation of reservoirs.

The above embodiments are only preferred ones of the invention, and are not intended to limit the invention in any forms. Any skilled in the art can obtain equivalent embodiments by modifying or transforming the above embodiments according to the technical contents disclosed above. Any simple modification, equivalent variations and improvements on the above embodiments according to the technical essence of the invention without deviating from the contents of the technical solution of the invention should also fall within the protection scope of the technical solution of the invention.

What is claimed is:

1. An acidizing solution for dissolution of a clay mineral, comprising:
   hydrochloric acid, fluoboric acid, acetic acid, trifluoroacetic acid, hydrogen peroxide, and ammonium chloride; and
   dimethylamino-methylbenzotriazole, alkyl ammonium chloride, and polymethylacrylic wherein in the acidizing solution, a mass concentration of hydrochloric acid is 10%-15%, a mass concentration of fluoboric acid is 5%-15%, a mass concentration of acetic acid is 2-3%, a mass concentration of trifluoroacetic acid is 4%-9%, a mass concentration of hydrogen peroxide is 15%-25%, a mass concentration of ammonium chloride is 5%, a mass concentration of dimethylamino-methylbenzotriazole is 1.5%-2%, a mass concentration of alkyl ammonium chloride is 0.5%-2%, a mass concentration of polymethylacrylic acid is 0.2%-1%, and a balance is water.

2. The acidizing solution for dissolution of a clay mineral according to claim 1, wherein the alkyl ammonium chloride is at least one selected from the group consisting of N-octadecyl propylidene diamine di-ammonium chloride and 3-Chloro-2-hydroxypropyl-trimethyl ammonium chloride.

3. A preparation method of the acidizing solution according to claim 1, comprising: under a stirring condition, adding dimethylamino-methylbenzotriazole to water, then slowly adding hydrochloric acid, fluoboric acid, acetic acid, trifluoroacetic acid and ammonium chloride, then adding hydrogen peroxide which is in turn mixed uniformly, and finally adding alkyl ammonium chloride and polymethylacrylic acid.

4. A method of acidizing a mud shale reservoir comprising:
   injecting the acidizing solution of claim 1 into the mud shale reservoir.

5. The method of claim 4, wherein the acidizing solution is applied to a reservoir with a clay mineral content over 30%.

6. The method of claim 4, wherein as for a high-temperature reservoir at a temperature over 160° C., the mass concentration. of trifluoroacetic acid in the acidizing solution is 7%-9%, and the mass concentration of hydrogen peroxide in the acidizing solution is 20%-25%.

7. The method of claim 4, wherein an imidazoline condensate is added to the acidizing solution, and the mass concentration of the imidazoline condensate in a prepared compound acidizing solution is 4%.

8. The method of claim 7, wherein the imidazoline condensate is a condensation product synthesized from an imidazoline compound, fatty acid, and derivatives of the fatty acid, the imidazoline compound has imidazoline five-membered heterocycle, the heterocycle has a hydrophilic branched chain containing different active groups such as an amide functional group, an amine functional group and a hydroxyl functional group as well as an alkyl hydrophobic branched chain containing different carbon chains, and the hydrophilic branched chain and the alkyl hydrophobic branched chain arc bonded to N.

* * * * *